(12) United States Patent
Han et al.

(10) Patent No.: US 6,864,190 B2
(45) Date of Patent: Mar. 8, 2005

(54) LASER CHEMICAL FABRICATION OF NANOSTRUCTURES

(75) Inventors: Yujie Han, Kitchener (CA); Suwas Nikumb, London (CA); Ben Li Luan, London (CA); John Nagata, London (CA)

(73) Assignee: National Research Council of Canada, Ottawa (CA)

( * ) Notice: Subject to any disclaimer, the term of this patent is extended or adjusted under 35 U.S.C. 154(b) by 113 days.

(21) Appl. No.: 10/271,549

(22) Filed: Oct. 17, 2002

(65) Prior Publication Data

US 2004/0076813 A1 Apr. 22, 2004

(51) Int. Cl.⁷ .............................................. H01L 21/31

(52) U.S. Cl. ..................... 438/778; 438/705; 438/48; 438/22

(58) Field of Search ........................ 438/753, 48, 22, 438/778; 257/3, 101–103

(56) References Cited

U.S. PATENT DOCUMENTS

| | | | |
|---|---|---|---|
| 4,450,041 A | 5/1984 | Aklufi et al. | |
| 4,652,334 A | 3/1987 | Jain et al. | |
| 4,661,201 A | 4/1987 | Petridis et al. | |
| 4,838,989 A | 6/1989 | Ashby et al. | |

(List continued on next page.)

FOREIGN PATENT DOCUMENTS

JP      01-196836     8/1989

OTHER PUBLICATIONS

Nerac Document No. 013–0358–4593–1 (Xu et al, *Appl Phys Lett*, 16 2081–2083 (1994)).
Nerac Document No. 083–0537–5281–5 (Kerkel et al, *IPRM 1996*, pp. 31–34 (1996)).
Nerac Document No. 100–0135–0510–6 (Ngan et al, *Journal of Porous Materials*, 7(1–3):41–45 (2000)).
Nerac Document No. 083–0539–0722–7 (Dimova–Malinovska, et al, *Vacuum*, 47(9):1133–8 (1996)).
Nerac Document No. 083–0536–5791–0 (Dimova–Malinovska, et al, *Applied Surface Science*, 96–98:457–62 (1996)).
Nerac Document No. 083–0536–2018–2 (Thoenissen et al, *Thin Solid Films*, 276(1–2):21–24 (1996)).
Nerac Document No. 083–0534–3511–1 (Jones etal, *J Vac Sci Technol, Vac Surf Films (USA)*, Part 2, vol. 14(3):1505–10 (1996)).
Nerac Document No. 011–0150–5125–0 (Gao et al, conference proceedings — Intl. Conference on Optoelectronic Science and Engineering (1994)).
Nerac Document No. 104–0027–0583–4 (Mavi et al, *Journal of Non–Crystalline Solids*, 286(3):162–168 (2001)).
Nerac Document No. 174–0693–8337–3 (Yamamoto et al, *Thin Solid Films*, 388(1–2):138–42 (2001)).
Nerac Document No. 011–0167–4695–7 (Li et al, *Acta Physica Sinica*, 47(1):124–130 (1998)).
Nerac Document No. 011–0156–8902–4 (Keshmiri et al, *Advanced Materials*—95, pp. 26–34 (1996).

Primary Examiner—Dung A. Le
(74) Attorney, Agent, or Firm—Anissimoff & Associates (57) ABSTRACT

Disclosed is a process for fabricating luminescent porous material, the process comprising pre-treating a substrate (e.g. crystalline silicon) with laser radiation (e.g from a Nd:YAG laser) in a predetermined pattern followed by exposing the irradiated substrate to a chemical stain etchant (e.g. $HF:HNO_3:H_2O$) to produce a luminescent nanoporous material. Luminescent porous material having a luminescence maximum greater than about 2100 meV may be produced by this method. Such nanoporous materials are useful in optoelectronic and other semiconductor devices.

24 Claims, 8 Drawing Sheets

U.S. PATENT DOCUMENTS

| | | |
|---|---|---|
| 4,978,418 A | 12/1990 | Arnold, Jr. et al. |
| 4,999,083 A | 3/1991 | Watanabe |
| 5,338,415 A * | 8/1994 | Sailor et al. ................. 205/645 |
| 5,348,618 A * | 9/1994 | Canham et al. ............. 438/705 |
| 5,421,958 A | 6/1995 | Fathauer et al. |
| 5,597,621 A | 1/1997 | Hummel et al. |
| 5,685,946 A | 11/1997 | Fathauer et al. |
| 5,746,829 A | 5/1998 | Matsunaga et al. |
| 2003/0205398 A1 * | 11/2003 | Sumida et al. ................ 174/50 |

\* cited by examiner

LASER CHEMICAL FABRICATION OF NANOSTRUCTURES

FIELD OF THE INVENTION

This invention relates to nanostructures and methods for their fabrication.

BACKGROUND OF THE INVENTION

The discovery of visible photoluminescence (PL) and electroluminescence (EL) from porous silicon has stimulated significant interest in this material and other nanoporous materials. Efficient visible luminescence may be achieved in porous semiconductor layers (e.g. silicon, germanium, silicon carbide, etc.), which has significant economic potential in optoelectronic devices (such as efficient visible emitters, solar cells, photodetectors, photonic band-gap crystals, displays, etc.), in gas and chemical sensors, and as sacrificial layers to realize 3-D patterns with high aspect ratio on bulk semiconductors.

Luminescent porous materials are currently made by a number of methods, including electrochemical anodization, chemical stain etching, hydrothermal etching and spark erosion techniques. In addition, lasers, ion beams and electron beams have also been used to modify the surface properties of various materials such as semiconductor materials.

Although porous materials can be produced by electrochemical anodization and spark erosion techniques, control of such processes is complicated. Using these techniques, it is also very difficult to make nanoporous materials from non-conductive substrates. A good electrical contact must first be formed and then it must be protected during the entire electrochemical etching process. When an electric current through a substrate is used, it is almost impossible to define areas of preferential etching, which makes it difficult for large scale integration (LSI).

When applied to silicon, anodic etching is limited to certain types of doped silicon. The process is difficult to control, particularly for n-type structures, and is not compatible with standard silicon fabrication technology. The formation of patterns is restricted by the application of current to the entire substrate. It is difficult to selectively form a high resolution pattern on the surface of the substrate.

Chemical stain etching is more suitable for massive industrial productions, but, when it is used alone the depth of the etching is shallower than electrochemical anodization. Also, the wetting period is relatively long for chemical stain etching alone, rendering the morphology of the resulting porous material rough and irregular. When used alone, chemical stain etching is usually slow (characterized by an induction period), irreproducible, unreliable in producing light-emitting porous materials, and is mainly used for making very thin layers.

There still remains a need in the art for simple and effective processes for producing luminescent porous materials.

SUMMARY OF THE INVENTION

In accordance with the present invention, there is provided a process for fabricating a luminescent porous material which comprises sequential application, first of laser radiation and then of chemical stain etching to a suitable substrate. Thus, there is provided a process for fabricating a luminescent porous material, the process comprising: providing a substrate suitable for fabricating a luminescent porous material; exposing the substrate to laser radiation in a predetermined pattern; subsequently followed by, exposing the irradiated substrate to a chemical stain etchant to form the luminescent porous material.

There is also provided a luminescent porous material having a luminescence maximum at an energy greater than about 2100 meV.

Pre-treatment of the substrate by laser radiation in a predetermined pattern generally produces a pattern of defects in the substrate, particularly on the surface of the substrate. Defects may include, for example, pits in the substrate, disorders in a crystal lattice of the substrate, etc. Some luminescence may be produced by the laser pre-treatment step, but the luminescence intensity from laser irradiation alone is generally too low for practical applications. The defects caused by laser irradiation serve as nucleation sites and are thus more susceptible to chemical stain etching than the non-irradiated areas of the substrate. The subsequent chemical stain etching step is thus enhanced for those portions of the substrate exposed to the laser radiation, thereby producing bigger and deeper pores and an increase in luminescence intensity in the laser irradiated portions of the substrate. The subsequent chemical stain etching of the substrate thereby produces a pattern of luminescent pores which follows the initial pattern of defects produced by the laser irradiation step.

It is known to use lasers in various micro-machining processes. Such micro-machining processes are designed to remove material from a substrate to produce products that are not luminescent. In contrast, the laser pre-treatment step of the present process minimizes the removal of substrate material while producing defects in the structure of the substrate in order to produce highly luminescent materials upon subsequent chemical stain etching.

Laser etching and chemical stain etching have been traditionally considered as different technologies, consequently, one skilled in the art would not generally consider combining the two technologies. The sequential application of laser radiation followed by chemical stain etching to a substrate may provide any of a number of advantages over existing processes for the fabrication of luminescent porous nanostructures. The process of the present invention may be faster, simpler, more direct and/or less expensive than existing processes. It may also improve accuracy of and/or control over pore size, size distribution, overall pattern formation and/or pattern transfer thereby producing more consistent materials. Better morphology of the luminescent porous material and better reproducibility of pattern formation may be achieved. Wetting time for the chemical stain etching step may be reduced.

Use of a laser beam as opposed to an electron or ion beam has advantageously been found to improve control over defect formation, including control over individual defects, process mechanisms and overall pattern formation, especially when the laser beam is used in conjunction with a subsequent chemical stain etching step. Such control may be obtained, for example, through choice of wavelength, choice of pulse parameters and control of laser articulation. For instance, use of laser irradiation permits structuring of the illumination pattern on the substrate resulting in better control over lateral microstructure of the porous material. Improved control over defect formation gives rise to improved luminescent materials and greater flexibility in the production of luminescent materials for specific applications.

A suitable substrate is any material which will become a luminescent porous material when the substrate is first exposed to laser radiation and then exposed to a chemical stain etchant. The substrate may exist in any solid state form. For example, crystalline, polycrystalline or amorphous forms, or even a substrate existing in a combination of forms, may be used provided the steps of laser irradiation followed by chemical stain etching produce a luminescent porous material.

The process is of particular use for semiconductor substrates. Many kinds of semiconductor substrates are known to those skilled in the art and are commercially available, for example, from Sumitomo Mitsubishi Silicon Corporation of Japan and University Wafers of the United States. Some illustrative examples are, among others, substrates which comprise silicon (Si), germanium (Ge), silicon carbide (SiC), gallium arsenide (GaAs), indium phosphide (InP), gallium indium phosphide (GaInP), indium gallium arsenide (InGaAs), indium gallium arsenic phosphide (InGaAsP), aluminum gallium arsenide (AlGaAs), and layered substrates such as Ge on Si, In/As on Ga/As and Ge/Si on Si, for example. Semiconductor substrates may be doped (e.g. p-type or n-type) or undoped.

The choice of chemical stain etchant is wide, provided the etchant is suitable for etching the desired substrate to produce a luminescent material in combination with laser pre-treatment. One skilled in the art will have little difficulty choosing an appropriate chemical etchant for a given substrate.

Chemical etchants typically, but not always, comprise an aqueous solution of an oxidizing agent and an anion which is capable of forming water-soluble complexes with the substrate. Suitable oxidizing agents include, but are not limited to, nitric acid, nitrates (e.g. lithium nitrate, sodium nitrate, potassium nitrate, barium nitrate, ammonium nitrate, etc.), nitrite (e.g. lithium nitrite, sodium nitrite, potassium nitrite, barium nitrite, ammonium nitrite, etc.), peroxides (e.g. hydrogen peroxide), permanganates (e.g. sodium permanganate, potassium permanganate, etc.), and persulfates (e.g. sodium persulfate, potassium persulfate, etc.), among others. Suitable anions include, but are not limited to fluoride, chloride and bromide, among others. The anion may be introduced in the form of an acid (e.g. HF, HCl, HBr, etc.) or in the form of a salt (e.g. LiF, NaF, KF, LiCl, NaCl, KCl, LiBr, NaBr, KBr, etc.). Etch rates are sometimes pH dependant so the addition of an inorganic or organic acid, such as sulphuric acid, phosphoric acid, acetic acid, etc., may be advantageous. Certain acids may also act as oxidizers.

In one embodiment, the chemical etchant may be a mixture of $HF:HNO_3:H_2O$. Such an etchant finds particular applicability to silicon-based or germanium-based substrates. Other substances, such as ethanol, acetic acid, bromide, etc., may also be used in this etching solution. The addition of bromide is particularly advantageous when the etchant is intended for a germanium-based substrate. The concentrations of each component may vary. A suitable range (by volume) is typically from 1–4 parts HF: 1–5 parts $HNO_3$:4–10 parts $H_2O$. An additional 1–4 parts of other substances may be included. Some examples are 1:3:5 ($HF:HNO_3:H_2O$), 1:5:10 ($HF:HNO_3:H_2O$), and 1:2:1:4 (HF (49%):$HNO_3$(70.4%):$CH_3COOH:H_2O$(additional)).

In another embodiment, the chemical etchant may be an aqueous mixture of permanganate and HF. This etchant is particularly useful for silicon-based or germanium-based substrates. The ratio of etchant components may vary. When potassium permanganate and a 47% HF solution are used, one suitable ratio of permanganate to HF solution is 3:97 by weight.

In another embodiment, the chemical etchant may be a mixture of HCl, acetic acid and water. This etchant is particularly useful for GaAs-based or GaInP-based substrates. The ratio of etchant components may vary. One suitable ratio is 1:10:3.5 ($HCl:CH_3COOH:H_2O$), among others.

In another embodiment, mixtures of water and peroxide with acids such as $H_2SO_4$, HF and HBr are particularly suited for etching GaAs-based substrates. Ratios of etchant components may vary, but typical examples include 8:1:1 ($H_2SO_4:H_2O_2:H_2O$), 10:1:150 ($HBr:H_2O_2:H_2O$) and 1:8.5:50 ($HF:H_2O_2:H_2O$), among others.

Other specific etching solutions are known to one skilled in the art and many etching solutions useful for one substrate may also be useful for other substrates.

Substrates may be chemical stain etched for any desired length of time. Typical etch times range from 1 to 180 minutes, more particularly 1 to 60 minutes. The etch time will depend on the size and depth of the pores and on other structural characteristics desired for a particular application. A longer etch time increases the size and depth of the pits formed in the substrate. However, it is generally an advantage of the present process over prior art processes that shorter etch times may be used to obtain similar pit sizes. Chemical stain etching may be performed at any suitable temperature. The temperature at which etching occurs may influence the properties of the luminescent porous material. Typically, etching is performed at or around room temperature. If desired, the substrate may be stirred in the chemical stain etchant using any convenient technique, for example, by using a mixer or by using ultrasound.

Both before and after the chemical stain etching step, substrates may be cleaned and dried to optimize the properties of the resulting porous luminescent material. Typically, cleaning may be done in a suitable organic solvent, such as acetone, ethanol, etc., followed by rinsing with deionized water (or vice versa) and then dried with an inert gas such as nitrogen, argon, etc. Combinations of different types of surface cleaning, etching and post-treatment conditions can give porous layers with various pore diameters.

Any laser may be used to pre-treat the substrate to form the initial pattern of defects in the substrate. Some examples of various types of lasers which may be employed in the invention are Nd:YAG lasers, InGaAsP/InP DFB lasers, GaAs/GaInP lasers, $CO_2$ lasers, diode pump solid state lasers, femtosecond (FS) lasers and picosecond (PS) lasers. The fundamental or higher harmonics of the laser may all be suitable for use in the process. For example, the fundamental wavelength of the Nd:YAG laser is 1064 nm with the second harmonic wavelength at 532 nm and the third harmonic wavelength at 355 nm. A variety of laser pulse widths may also be used, with pulse widths on the order of 1 millisecond to 1 femtosecond being particularly suitable.

Fabrication of various feature types in a substrate may depend on a balance of various laser process parameters. The choice of laser, laser characteristics and laser processing parameters may also depend somewhat on the type of substrate used. For example, by controlling the combination of pulse width and energy of the laser, different structures and different luminescent properties may be fabricated into a substrate. In general, the variations are virtually unlimited and it is within the ability of one skilled in the art to determine the optimal parameters for fabricating the specific desired features on a case-by-case basis.

Without being held to any specific mechanism of action, it is thought that surface modification of a substrate may be due to rapid heating, melting, resolidification and recrystallization of the substrate by the laser beam. It is further thought that the superheated melt activates internal gettering centres in the substrate, which are more susceptible to subsequent chemical stain etching. In order to optimize the process, control of laser power density is desirable. Very high laser power densities may cause evaporation of the substrate before melting. Therefore, it is desirable to set the laser power density so that the surface temperature of the region of the substrate exposed to laser radiation first reaches the melting point of the substrate and initiates the melting process. The temperature of the melt can then be allowed to rise above the melting temperature but below the boiling temperature to permit the formation of a superheated melt, resulting in a solid-liquid interface extending into the substrate. It is thought that the build up of high temperature gradients in the region of laser interaction favours the diffusion of impurities in the substrate into the laser-treated region, thus contributing to the activation of internal gettering centres. Since surface morphology appears to be sensitive to laser process parameters, optimization of laser parameters is desirable for obtaining the specific effects for the intended purpose. Such parameters are optimized on a case by case basis depending on the effects desired.

The use of nanosized filters as masks advantageously improves accuracy and control of the laser pre-treatment step providing a more orderly and precise arrangement of defects produced in the substrate by laser irradiation. Use of masks with nano-dimensional feature sizes further facilitates the preparation of luminescent nanoporous materials. In the prior art, obtaining nanosized features on a substrate using standard photoresist masks has been very difficult. It has now been found that the use of nanosized filters in conjunction with the laser pre-treatment step of the present invention enhances the ability to obtain nanosized features on a substrate following the subsequent chemical stain etching step. This represents a further step forward in process control for the fabrication of luminescent nanoporous materials for specific utilities.

A variety of nanosize filters (masks) are suitable for use in the process. Nanosize filters may be obtained commercially, for example, from Whatman and Glycol Specialties Inc., or they may be fabricated using nano-machining methods to obtain custom designed filters. Such nano-machining methods include, for example, electro-chemical polishing and anodization (EPA), laser nano-machining and electrochemical machining (ECM).

One skilled in the art will recognize suitable nanosize filters. For example, membrane filters, such as anodic alumina formed by electrochemical anodization, alumina sealed into a sandwich-type structure by polymers with nanosize particles, polymeric membrane filters (e.g. mixed cellulose ester membrane, polycarbonate membrane, etc.), membrane filters made from other nanopore materials, filters made from single crystal aluminum with specific orientation, or combinations thereof, are suitable filters for use in the process. In general, nanosize filters may be made from any nanopore material that is thermally and mechanically stable and can withstand incident laser power density with little or no deterioration.

Filters may be designed with different shapes, thickness, patterns (regular or irregular) and/or different materials to impart desired pore characteristics to the substrate. By selecting appropriate shape, density and size of the nanopores on the masking filter and by optimizing the process parameters of laser pre-treatment, it is possible to improve control over the size and exact position of the area to be subsequently chemical stain etched, leading to improved properties of the luminescent porous material produced. In addition, filters may be cleaned with acetone, ethanol and/or deionized water before use to minimize contamination.

Assist gases and/or other chemicals may be used during laser pre-treatment to assist with the initial patterning. Assist gases may be used to provide an inert ambient condition to avoid unwanted reactions and to help minimize evaporation of substrate during laser pre-treatment. Gases such as argon, helium, air and nitrogen may all be used. The exact pressure of the assist gas is generally not critical, but too low of a pressure may result in agglomeration of the substrate material while too high of a pressure may damage the substrate, cause separation of the mask (filter) or cause other structural changes. A pressure of 1–10 psi (e.g. 5 psi) is generally suitable. The specific assist gas and/or other chemicals used may also depend on the nature of the substrate and on the type of laser being used. One skilled in the art can determine the optimal assist gas and pressure by simple experiment.

A wide variety of coatings may be applied to the nanoporous substrate after fabrication of the porous material to improve the properties of the material. For example, metals (e.g. gold, nickel, copper, aluminum, etc.), ceramics and polymers may all be suitable coatings.

Multi-layered nanoporous structures and materials can be produced using the process of the present invention by choosing process parameters, different laser characteristics, different chemical stain etchants, different assist gases or combinations thereof. Several processing steps using different combinations can be done on a single substrate to fabricate a variety of multi-layered structures and materials.

Luminescent porous materials fabricated by a process of the present invention may have a luminescence maximum at an energy greater than about 2100 meV, or at an energy in a range of from about 2100 meV to about 3500 meV. Therefore, it is now possible to fabricate porous materials that luminesce in a region of the electromagnetic spectrum other than the red region. In one embodiment, a luminescent porous material having a luminescence maximum at an energy of from about 2100 meV to about 2400 meV, more particularly at about 2200 meV, may be fabricated. In another embodiment, a luminescent porous material having a luminescence maximum at an energy of from about 2800 meV to about 3200 meV, more particularly at about 2950 meV, may be fabricated.

Luminescent porous materials fabricated by a process of the present invention may be useful in optoelectronic and other semiconductor devices. For example, the luminescent porous material may find application in optoelectronic devices such as efficient visible emitters, solar cells, photodetectors, photonic band-gap crystals, displays, etc., in gas and chemical sensors, and as sacrificial layers to realize 3-D patterns with high aspect ratio on bulk semiconductors. They may be of particular use in biological applications. The luminescent porous material may also be useful in security applications, for instance, in creating identification marks that are invisible under normal conditions but whose luminescence can be detected with luminescence detectors.

BRIEF DESCRIPTION OF THE DRAWINGS

In order that the invention may be more clearly understood, preferred embodiments thereof will now be described in detail by way of example, with reference to the accompanying drawings, in which.

DESCRIPTION OF PREFERRED EMBODIMENTS

Figure 1:
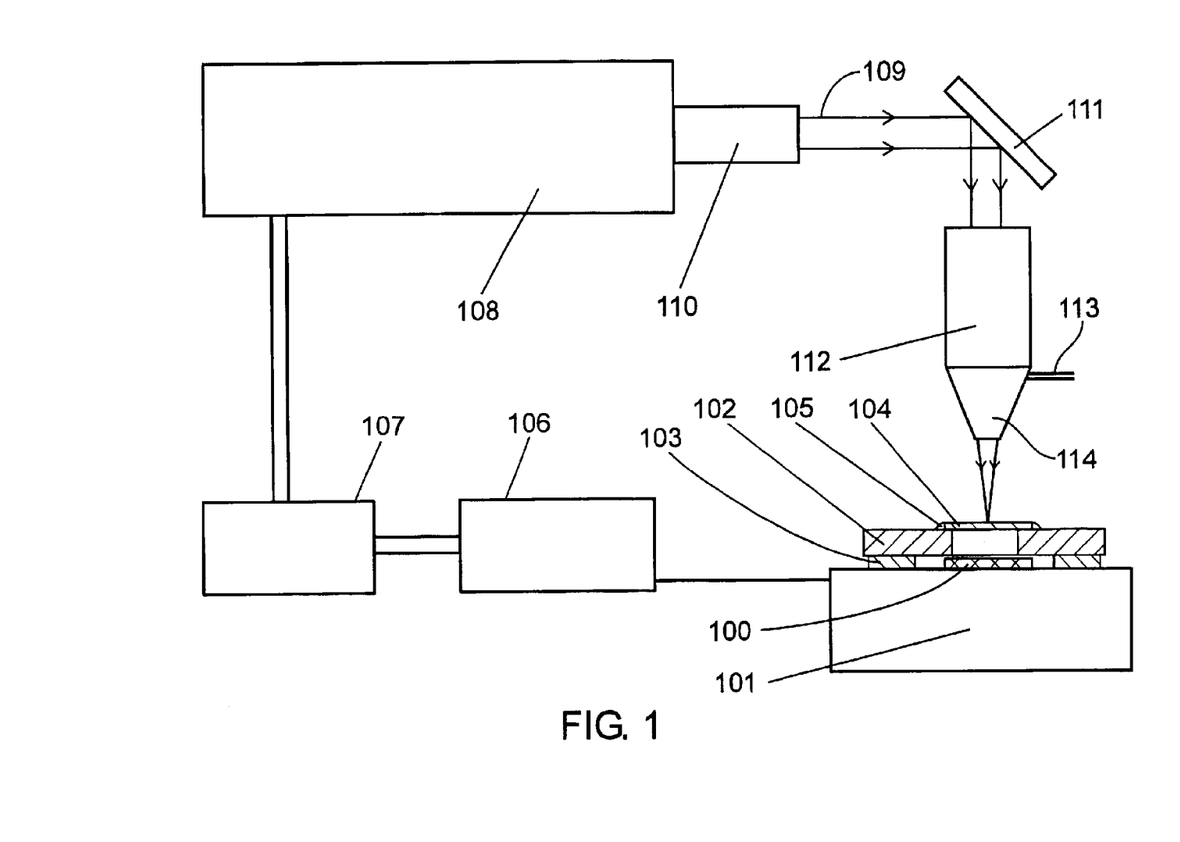
FIG. 1 is a schematic diagram of a laser pre-treatment system using a direct write laser scanning technique with focused beam.

FIG. 1 is a schematic diagram of a preferred laser pre-treatment system using a direct write laser scanning technique with focused beam. A substrate or target (100) is held in place on an x-y motion stage (101) by a holder (102) which has a hole in it to permit passage of laser light to the substrate (100). A spacer (103) made of metal or glass prevents the holder (102) from damaging the substrate (100). A nanosize filter mask (104) (for example, with pore sizes between 0.02 and 0.1 $\mu$m) is placed on top of the holder (102) and is held to the holder (102) with vacuum grease (105). A glue, such as RTV9732, may be used instead of vacuum grease but vacuum grease is preferred as it is more easily pealed off. The thickness of the holder (102) is set to provide an optimum gap between the filter mask (104) and the substrate (100). The gap size is suitably greater than 50 $\mu$m, typically up to 1 mm, and is adjusted depending on other system parameters (e.g. laser wavelength, pore size of mask, laser fluence, thickness of filter) in order to minimize diffraction effects. Likewise, the thickness of the spacer (103) is set to accommodate the thickness of the substrate (100).

The motion stage (101) is movable in substantially orthogonal x and y directions in order to control the locations on the substrate which are exposed to laser radiation during the pre-treatment step. The motion stage (101) is controlled through a motor control (106) which in turn is controlled from a computer (107). The computer (107) also controls the operation of laser (108). The computer (107) can co-ordinate movement of the motion stage (101) with the operation of the laser (108) in order to achieve the desired patterning effect on the substrate (100). Laser light (109) from the laser (108) is expanded by a beam expander (110) in TEM00 mode to provide a good quality gaussian beam. The beam is then reflected from a mirror (111) to an objective and focusing lens (112) for focusing on the sample (100) through the filter mask (104). An assist gas is introduced through tube (113) into nozzle (114) to be directed down to the filter mask (104) and substrate (100). In addition to assist gas, suction may also be applied to the region around the substrate using an external nozzle. The combination of precisely controlled movement of the motion stage, careful control over laser parameters, presence of the assist gas and use of the filter mask (104) permits highly precise and detailed pattern development on the substrate (100).

The laser (108) is advantageously a Nd:YAG laser. The short-pulsed (30 ns), ultraviolet wavelength (355 nm) radiation from the third harmonics of the Nd:YAG laser serves as an excellent non-contact tool for semiconductor surface modifications and surface treatments. The high photon energy and short duration of the laser pulses can efficiently initiate photochemical and/or photothermal surface reactions leading to high precision micromachining, indelible marking and microstructure modifications. An average laser power ranging from 0.4 W to 1.9 W is preferably used.

Figure 2:
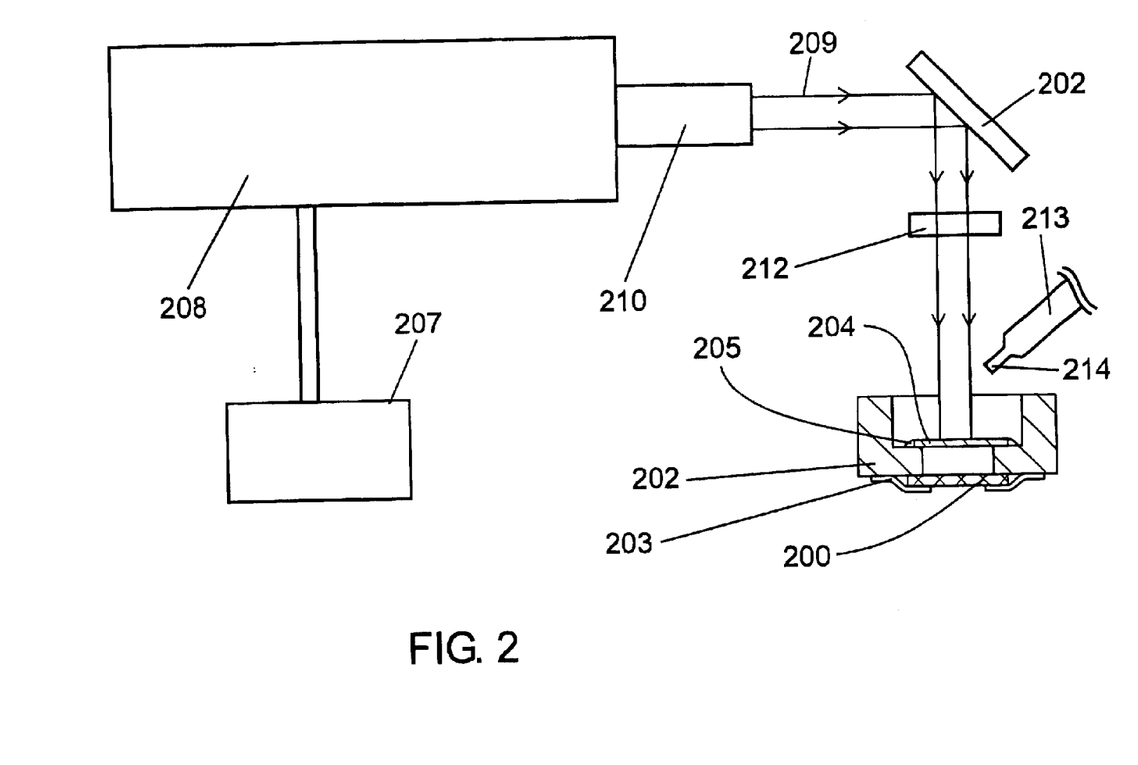
FIG. 2 is a schematic diagram of a laser pre-treatment system using an unfocused beam.

FIG. 2 is a schematic diagram of a preferred laser pre-treatment system using an unfocused beam. A substrate or target (200) is held to the underside of a holder (202) by a fastener (203). Any suitable fastener may be used, for example, adhesive tape, clips, etc., although in FIG. 2, the use of adhesive tape is depicted. The holder (202) has a hole in it to permit passage of laser light to the substrate. A nanosize filter mask (204) is placed on the holder (202) and is held to the holder (202) with vacuum grease or glue (205). The thickness of the holder (202) between the filter mask (204) and the substrate (200) is set to provide an optimum gap between the filter mask (204) and the substrate (200). The filter mask (204) provides a predetermined pattern which is transferred to the substrate (200) upon exposure of the substrate (200) to laser light that passes through the filter mask (204).

An optional motion stage (not shown) is movable in substantially orthogonal x and y directions in order to help control the locations on the substrate which are exposed to laser radiation during the pre-treatment step. The optional motion stage may be controlled through a motor control (not shown) which in turn is controlled from a computer (207). The computer (207) controls the operation of laser (208). When a motion stage is used, the computer (207) can co-ordinate movement of the motion stage with the operation of the laser (208). Laser light (209) from the laser (208) is expanded by a beam expander (210) and is reflected from a mirror (211) through an aperture (212) to make its way to the filter mask (204) and substrate (200). The aperture helps provide a clean laser beam and helps control beam size. Since no objective and focusing lens is used, the laser beam is unfocused and wider (on the order of about 10 mm) compared to the system depicted in FIG. 1. Thus, more laser fluence is generally required to achieve the desired results. An assist gas is introduced through tube (213) into nozzle (214) to be directed down to filter mask (204) and substrate (200).

Many of the components of the system depicted in FIG. 2 are similar to those in FIG. 1 and have similar specifications as described for FIG. 1. The main difference between the systems in FIGS. 1 and 2 is the focusing of the laser beam in the system of FIG. 1. The system of FIG. 1 is therefore particularly useful for fine work such as printing, wires, etc. while the system of FIG. 2 is most useful for industrial scale fabrications.

EXAMPLE 1

Silicon (Si)

Laser Pre-Treatment:

Commercial (University Wafers) p-type boron-doped (100) Si wafers 530 μm thick with resistivities ranging from 20 to 30 Ω-cm were polished and used as substrates. Laser pre-treatment of the wafers was carried out using a Nd:YAG laser as described for FIG. 1 above. The laser irradiation density was controlled so that the energy level at the irradiated area is equal to or greater than the upper limit energy level for annealing in order to maximize grain size of the p-Si obtained. The pulse width of the laser beam was 30 ns and the frequency from 1 Hz to 30 kHz. Laser power ranging from 0.4 W to 1.9 W was used to find the optimized power density. Circular Whatman Anodisc™ 13 nanosized filter masks were used, having a thickness of 60 μm and a diameter of 13 mm. For some samples, the pore size of the filter was 0.02 μm while for the other samples the pore size of the filter was 0.1 μm. Air was used as the assist gas.

Figure 3A:
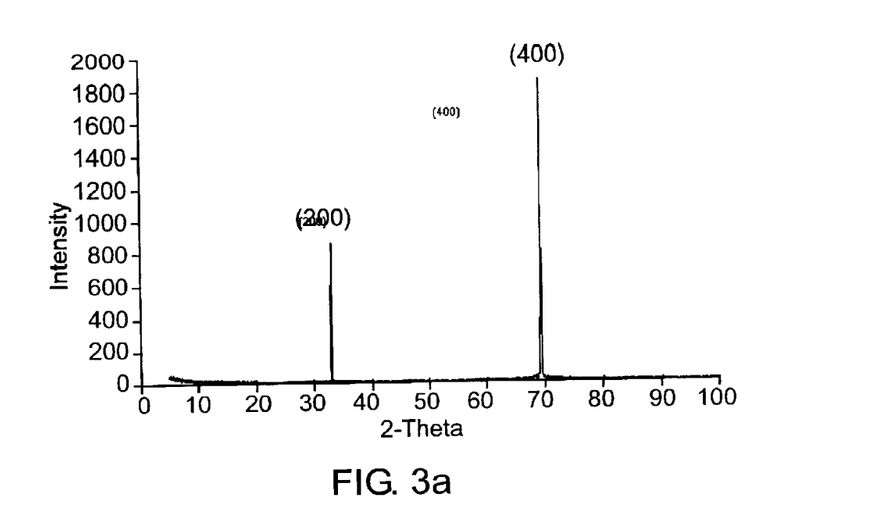
FIGS. 3a and 3b are X-ray diffraction (XRD) patterns of silicon wafers before (FIG. 3a) and after (FIG. 3b) laser pre-treatment.
Figure 3B:
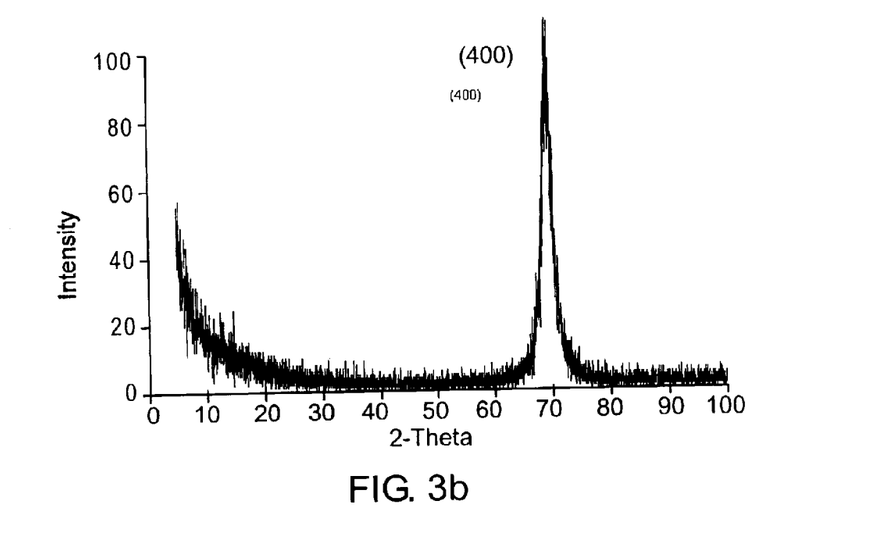
Figure 4A:
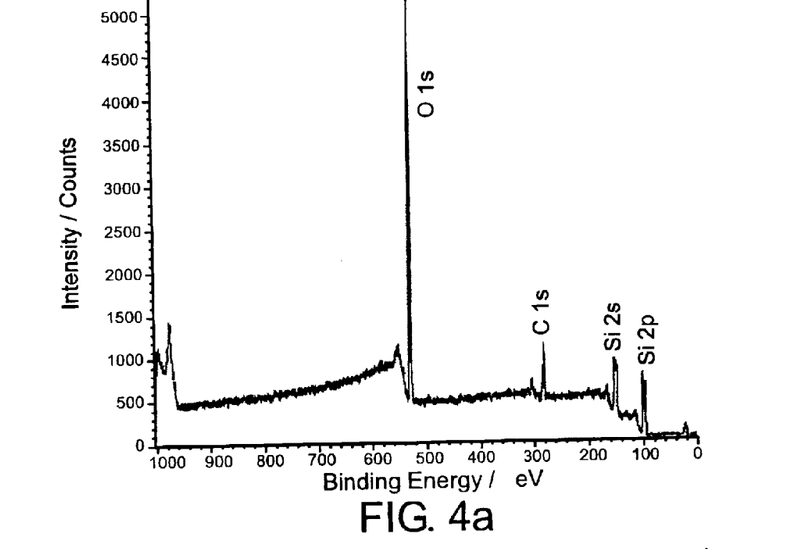
FIGS. 4a and 4b are X-ray photoelectron spectra (XPS) of silicon wafers before (FIG. 4a) and after (FIG. 4b) laser pre-treatment.
Figure 4B:
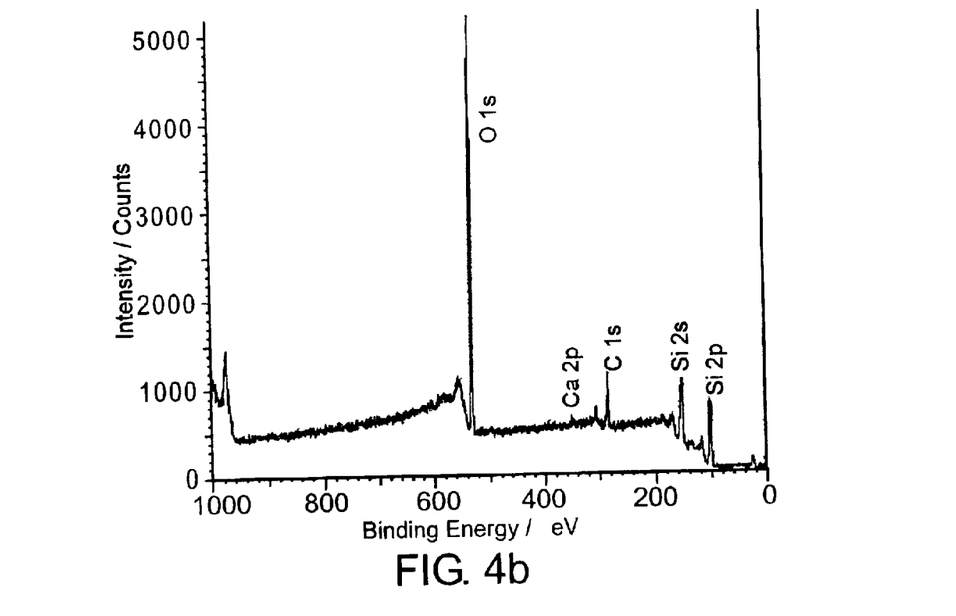

Results from X-ray diffraction (XRD) (FIGS. 3a and 3b) and X-ray photoelectron spectroscopy (XPS) (FIGS. 4a and 4b) clearly showed that surface modifications of the silicon substrate occurred as a result of laser irradiation. Referring to XPS results depicted in FIGS. 4a and 4b, the silicon substrate showed a characteristic calcium (Ca) 2p peak after laser pre-treatment, and the oxygen (O) 1s peak observed was smaller than the oxygen 1s peak of the silicon substrate before laser pre-treatment. The silicon (Si) 2p peak existed as Si and $SiO_2$ and the amount of $SiO_2$ was smaller after laser pre-treatment. Ca is very active and may serve as a nucleation centre during subsequent chemical stain etching at the initial stage. It is evident that XPS results indicate that structural changes resulting from the incident laser radiation results in a redistribution of impurities on the Si substrate surface.

Chemical Stain Etching:

A chemical stain etching solution was prepared by mixing 20 mls of Reagent grade HF (48%) with 60 mls of Trace Metal Grade $HNO_3$ (69–71%) at room temperature to form an acid mixture. Then, a heavily doped $p^{++}$ silicon wafer (about 0.5 $cm^2$ in area with a resistivity ranging from 0.001 to 0.005 Ωcm) was immersed in this solution for five minutes in order to ensure an adequate supply of positively charged ions in the etching solution to catalyze the etching reaction. The acid mixture was then added to 100 ml de-ionized water (5.9 mΩ-cm) with stirring by magnetic stir bar to form the etching solution ($HF:HNO_3:H_2O$ in a ratio of 1:3:5 by volume).

Laser pre-treated silicon substrates as prepared above were cleaned in an ethanol bath, rinsed with deionized water and dried with nitrogen gas. The silicon substrates were then completely immersed in the etching solution and stirred. Sample substrates were taken out after 30 minutes. After removal from the etching solution, substrates were rinsed with deionized water and dried with nitrogen gas. The luminescent porous silicon materials so formed were stored in closed bags under nitrogen gas.

Figure 5:
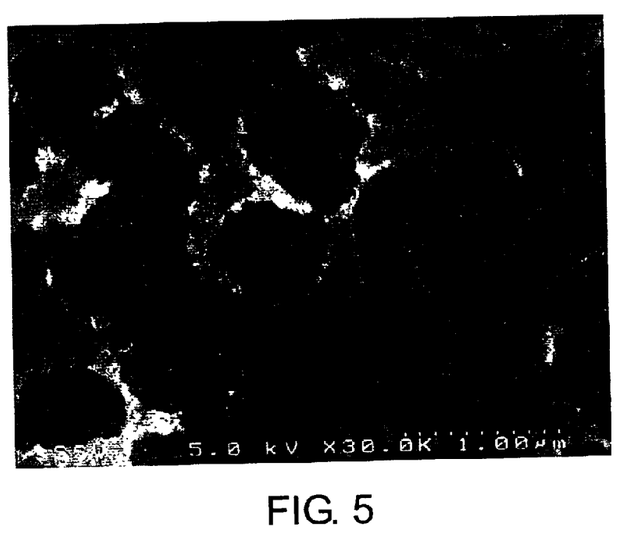
FIG. 5 is a scanning electron micrograph (SEM) of nano-structured silicon.

FIG. 5 is a scanning electron micrograph (SEM) of the lower surface layer of the nano-structured silicon fabricated in Example 1. FIG. 5 illustrates the size of the structures formed inside the pores after the process is complete. It is evident that nanosize structures have been formed.

Figure 6A:
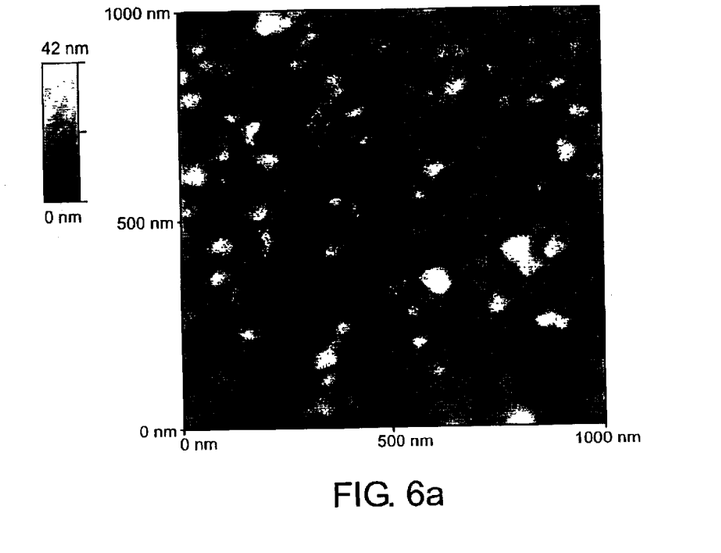
FIGS. 6a and 6b are atomic force micrographs (AFM) of nano-structured silicon.
Figure 6B:
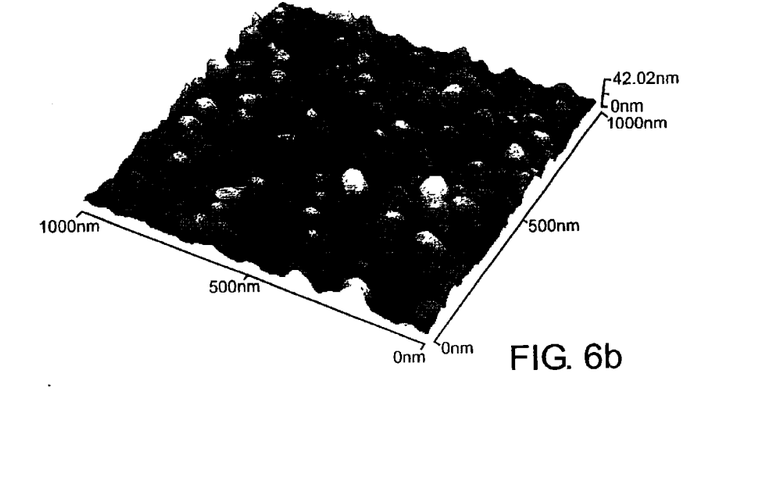

FIGS. 6a and 6b are atomic force micrographs (AFM) of nano-structured silicon fabricated in Example 1. FIGS. 6a and 6b depict the pattern of pits (pores) seen as peaks and valleys in the porous silicon material. The lower layers of the etched silicon are visible inside individual pores. The x and y axes of the micrographs depicted in FIGS. 6a and 6b provide a measure of the width of the peaks and valleys, while the grey-scale intensity provides a measure of the peak height (and therefore pore depth) as delineated in the grey-scale chart to the left of the micrograph in FIG. 6a. It is evident from FIGS. 6a and 6b that the diameter of the pits varies and is typically about 20 nm. Measurement on the depth and diameter of the pits is limited by resolution but depths appear to range from about 3 nm to about 40 nm.

EXAMPLE 2

Gallium Arsenide (GaAs)

Figure 7:
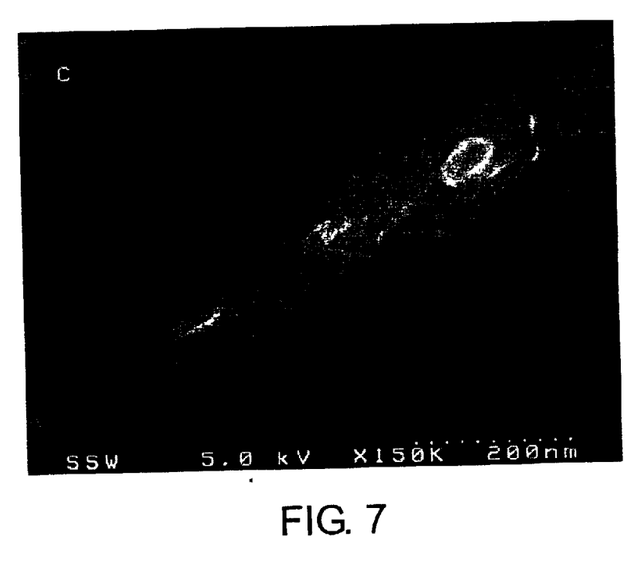
FIG. 7 is a scanning electron micrograph (SEM) of nano-structured gallium arsenide (GaAs)

A process as described in Example 1 was carried out except that a gallium arsenide (GaAs) substrate was used instead of a silicon substrate. FIG. 7 is a scanning electron micrograph (SEM) of the lower surface layer of nano-structured gallium arsenide (GaAs) fabricated in Example 2. FIG. 7 illustrates the structures formed inside the pores after the process is complete. The magnification in FIG. 7 is about five times the magnification used in FIG. 5. It is evident that nanosize structures have been formed in the GaAs substrate.

EXAMPLE 3

Luminescence

Figure 8:
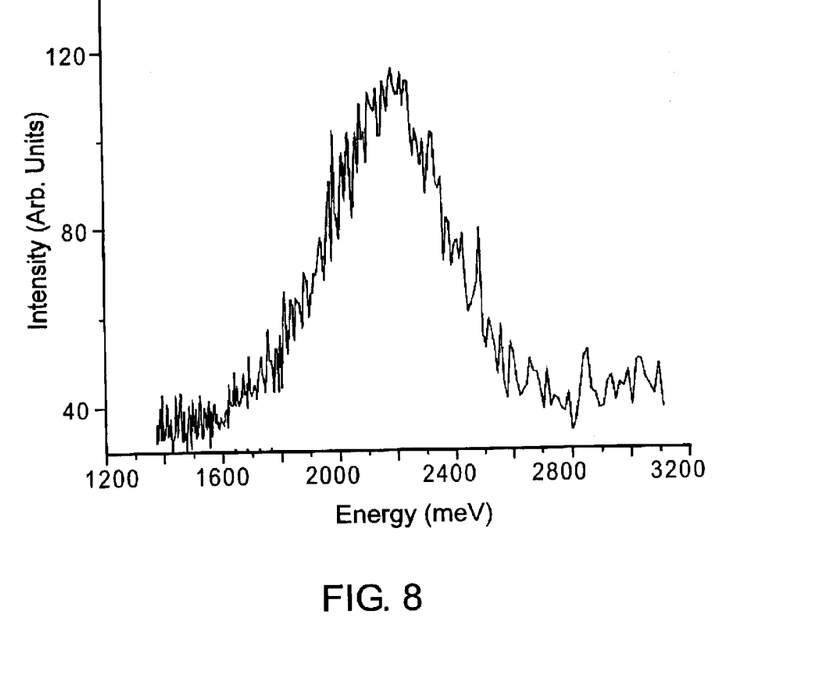
FIG. 8 is a luminescence spectrum, taken at a temperature of 7 Kelvin, of a nano-structured porous silicon sample fabricated by a process of the invention using a 1:3:5 by volume $HF:HNO_3:H_2O$ solution as etchant; and, FIG. 9 is a luminescence spectrum, taken at a temperature of 7 Kelvin, of a nano-structured porous silicon sample fabricated by a process of the invention using a 1:5:10 by volume $HF:HNO_3:H_2O$ solution as etchant.
Figure 9:
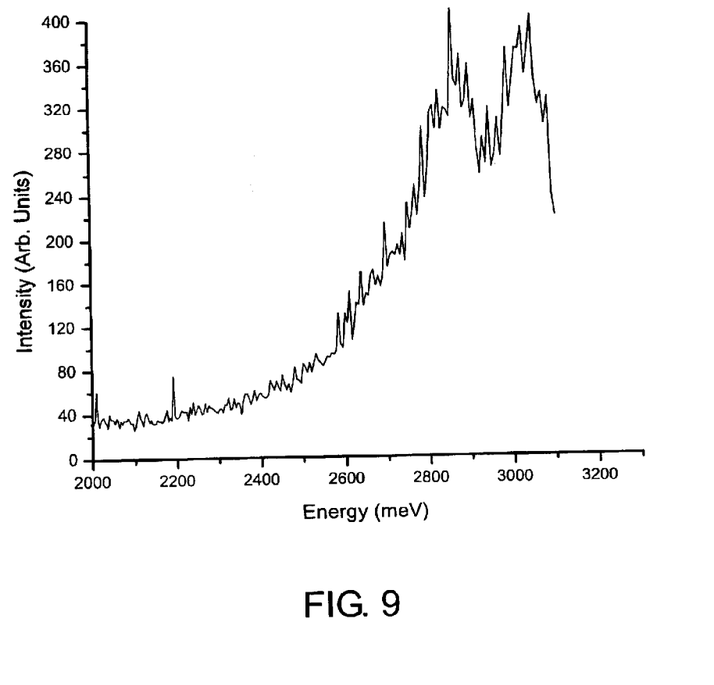

FIG. 8 is a luminescence spectrum, taken at a temperature of 7 Kelvin, of a nano-structured porous silicon sample fabricated in Example 1. FIG. 8 shows that the energy at which the luminescence intensity is maximum is about 2200 meV, which is in the green/yellow region of the electromagnetic spectrum. FIG. 9 is a luminescence spectrum, taken at a temperature of 7 Kelvin, of a nano-structured porous silicon sample fabricated by a method similar to Example 1 except that a chemical stain etchant comprising 1:5:10 by volume $HF:HNO_3:H_2O$ was used instead of a chemical stain etchant comprising 1:3:5 by volume $HF:HNO_3:H_2O$, and the substrate was not pre-cleaned with ethanol before chemical stain etching since it has been found that pre-cleaning is not necessary unless the substrate is particularly dirty or oily. The luminescence spectrum in FIG. 9 shows that the energy at which the luminescence intensity is maximum is about 2950 meV, which is closer to the blue region of the electromagnetic spectrum. The apparent double hump in the luminescence spectrum depicted in FIG. 9 is attributed to noise and the maximum was determined as the energy of half width at half height of the peak.

In contrast, the ion beam milling process as described in U.S. Pat. No. 5,421,958 provides porous silicon materials having a luminescence intensity maximum at a wavelength of about 6800 Angstrom (about 1820 meV), which is in the red/infrared region of the electromagnetic spectrum. The chemical stain etchant used in U.S. Pat. No. 5,421,958 comprised 1:5:10 by volume $HF:HNO_3:H_2O$. It is evident, therefore, that laser etching provides unexpectedly different luminescent properties than ion milling.

Luminescent materials that luminesce in the green/yellow region or blue region may be useful in a variety of applications which may not be appropriate for materials that luminesce in the red/infrared region, for example, in various biological applications.

It is evident to one skilled in the art that modifications to and variations of the disclosed invention may be made without departing from the spirit of the invention and that such modifications and variations are encompassed by the scope of the claims appended hereto.

What is claimed is:

1. A process for fabricating a luminescent porous material, the process comprising:
   (a) providing a substrate suitable for fabricating a luminescent porous material;
   (b) exposing the substrate to laser radiation in a predetermined pattern; subsequently followed by,
   (c) exposing the irradiated substrate to a chemical stain etchant to form the luminescent porous material.

2. The process according to claim 1, wherein the substrate is a semiconductor substrate.

3. The process according to claim 2, wherein the substrate is Si, Ge, SiC, GaAs, InP, GaInP, InGaAs, InGaAsP or AlGaAs.

4. The process according to claim 2, wherein the substrate is doped Si.

5. The process according to claim 2, wherein the substrate is undoped Si.

6. The process according to claim 1, wherein the laser radiation is produced by a Nd:YAG laser.

7. The process according to claim 1, wherein the laser radiation is focused on the substrate.

8. The process according to claim 1, wherein the laser radiation is unfocused on the substrate.

9. The process according to claim 1, wherein power density of the laser radiation is controlled to minimize evaporation of the substrate.

10. The process according to claim 1, wherein the pattern is obtained by relative movement of the laser radiation with respect to the substrate and/or by virtue of a nanosize filter.

11. The process according to claim 1, which further comprises providing a nanosize filter through which the laser radiation passes before reaching the substrate.

12. The process according to claim 11, wherein the nanosize filter is fabricated using a nano-machining method selected from the group consisting of electrochemical polishing and anodization (EPA), electrochemical machining (ECM) and laser nano-machining.

13. The process according to claim 1, which further comprises providing an assist gas.

14. The process according to claim 13, wherein the assist gas is air, nitrogen, argon or helium.

15. The process according to claim 1, which further comprises cleaning the substrate.

16. The process according to claim 1, which further comprises applying a coating to the luminescent porous material.

17. A process for fabricating luminescent porous silicon, the process comprising:
   (a) providing a silicon substrate suitable for fabricating luminescent porous silicon;
   (b) exposing the silicon substrate to laser radiation in a predetermined pattern; subsequently followed by,
   (c) exposing the irradiated substrate to a chemical stain etchant to form the luminescent porous silicon.

18. The process according to claim 17, wherein the silicon substrate is crystalline or polycrystalline.

19. The process according to claim 18, wherein the silicon substrate is a doped semiconductor substrate.

20. The process according to claim 18, wherein the silicon substrate is an undoped semiconductor substrate.

21. The process according to claim 17, which further comprises providing a nanosize filter through which the laser radiation passes before reaching the silicon substrate.

22. The process according to claim 21, wherein the nanosize filter is fabricated using a nano-machining method selected from the group consisting of electrochemical polishing and anodization (EPA), electrochemical machining (ECM) and laser nano-machining.

23. The process according to claim 17, wherein the chemical stain etchant comprises a mixture of hydrofluoric acid, nitric acid and water.

24. The process according to claim 23, wherein the hydrofluoric acid, nitric acid and water are present in the mixture in a ratio of 1:3:5 by volume.

* * * * *